Patented May 29, 1951

2,555,210

UNITED STATES PATENT OFFICE 2,555,210

METHOD AND APPARATUS FOR CARRYING OUT CATALYTIC REACTIONS WITH MOVING CATALYST

Paul M. Waddill, Bartlesville, and Frank C. Fowler, Norman, Okla., assignors to Phillips Petroleum Company, a corporation of Delaware Application May 9, 1946, Serial No. 668,617

10 Claims. (Cl. 48—214)

This invention pertains to apparatus and methods for effecting high temperature catalytic reactions.

In a specific embodiment the invention relates to apparatus and methods for effecting catalytic reactions at high temperatures wherein the heat requirements for the reaction are supplied by a moving stream of hot refractory pebbles which have been heated externally of the reaction chamber.

Conventional pebble heater apparatus provides a pebble heating chamber positioned above a reaction chamber with a connecting neck between the two chambers. Pebbles of ceramic, metal, or other refractory materials are heated by direct contact with hot combustion gas as they flow through the pebble heater and pass through the neck into the reaction chamber where they give up heat to reactant gases being passed through the reaction chamber usually in countercurrent flow to the pebbles which are descending by gravity flow therethrough. Considerably higher temperatures are necessarily maintained in the heater than in the reactor which frequently makes it undesirable to utilize pebbles coated, impregnated, or constructed of catalytic materials. The catalysts desirable in a given process frequently will not withstand the temperatures required in the heater but will not be unduly deactivated by the temperatures required in the reactor.

It is an object of this invention to provide apparatus of the pebble heater type which permits the use of catalytic materials in the reaction chamber without subjecting them to the severe temperatures of the pebble heating chamber.

It is also an object of this invention to provide a method for effecting catalytic reactions at high temperatures using pebble heater technique without subjecting the catalyst to the extreme heating conditions of the pebble heating zone.

A further object of the invention is to provide novel and useful means of returning pebbles from the reaction chamber of a pebble heater apparatus to the pebble heating zone.

Still another object of the invention is to provide novel and useful means of separating different kinds of pebbles from a mass of pebbles circulated through pebble heater apparatus.

Other objects of the invention will become apparent from the accompanying description.

The term "pebble" as used throughout the specification, including the claims, denotes any refractory material in flowable form and size which will flow readily by gravity through the chambers of a pebble heater type apparatus. Pebbles are preferably substantially spherical and are about 1/16" to 1" in diameter with the preferred size about 1/8" to 3/8".

The term "non-catalytic pebble" denotes a pebble constituted of material or materials that are relatively ineffectual in promoting the reaction being conducted in the reaction chamber. The term "catalytic pebble" denotes a pebble constituted of material or materials which are highly effective in promoting the reaction of a particular process. The terms "non-catalytic" and "catalytic" are relative to the particular reaction being effected in a given process.

Pebbles, either catalytic or non-catalytic, must be constructed or constituted of refractory materials which will withstand temperatures at least as high as the highest temperatures to which they are subjected in a given process. They may be of ceramic, metal, or other refractory materials. It is important that the pebbles be sufficiently dense and sufficiently large that entrainment in the upward flowing gases in both the pebble heating chamber and in the reaction chamber is avoided. On the other hand, the pebbles used must not be so unduly large or dense that elevation in a gas lift is rendered impractical. Pebbles composed of alumina, beryllia, "Carborundum," mullite, periclase, and zirconia as well as metallic pebbles such as iron, nickel, cobalt, platinum metals, copper, silver, vanadium, molybdenum, chromium, tungsten, manganese and their alloys are effective in various process. Metal pebbles coated or plated with another metal are also effective, e. g., iron or copper coated with nickel. Hollow metal balls are desirable catalytic pebbles where economy of metal is important. While such balls are lighter in weight than solid pebbles and require modified separation, this feature does not render them impractical in operation.

In accordance with the present invention, two different types of pebbles are circulated through the reaction zone, i. e., a relatively non-catalytic pebble, preferably of high heat capacity, and a highly catalytic pebble. The non-catalytic pebbles are heated in a conventional pebble heater by direct contact with hot combustion gases as they flow by gravity therethrough and are mixed with catalytic pebbles after they flow from the reactor, the combined stream of non-catalytic and catalytic pebbles then flowing downwardly through the reactor in contact with an upwardly flowing stream of reactant gases. The stream of mixed pebbles thus both heat and catalyze the reactants. As the mixed stream of pebbles flows from the reactor it is passed to a separating and elevating means whereby the non-catalytic are separated from the catalytic pebbles, the former being elevated to a level above the inlet to the pebble heater and the latter to a point above the level of the inlet of such pebbles to the stream of non-catalytic pebbles. In this manner of operation, the non-catalytic heat conducting pebbles, only, are recycled through the extremely hot pebble heater and the catalytic pebbles are recycled through the reaction zone, only, thus avoiding the undesirable deterioration of the catalytic pebbles which normally results from the severe temperature and oxidation conditions of the pebble heating chamber.

The invention is applicable to a great variety of endothermic processes including catalytic cracking and dehydrogenation of hydrocarbons, the production of water gas by reacting steam with hydrocarbons, the production of HCN from ammonia and carbon monoxide, the manufacture of $CS_2$ from hydrocarbons and sulfur, etc. In fact, the invention is applicable to advantage to all catalytic processes that may be conducted in pebble heater type apparatus. This type of apparatus functions to best advantage in processes requiring temperatures from about 1200° to about 3200° F. and requiring close temperature control with sharp heating.

In order to obtain a more complete understanding of the invention, reference may be had to the accompanying drawing which is a diagrammatic showing of an arrangement of apparatus according to the invention.

By way of illustration, the invention will be described further with particular reference to a process in which low-boiling hydrocarbons are converted to water gas by reaction with steam. This process is carried out advantageously at temperatures between about 1500° F. and 3000° F. in the presence of metallic nickel as a catalyst. Using the apparatus shown, a suitable mixture of hydrocarbons and steam is introduced into reaction chamber 10 through line 11 where it is quickly raised to above reaction temperature such as about 2250° F. by heat supplied by a stream of hot ceramic pebbles, such as $\frac{3}{16}''$ alumina pebbles 12. These alumina pebbles passing through reactor 10 have just been heated in heating chamber 13 by direct contact with hot combustion gas from burner 14 which is supplied with fuel gas from line 15. The alumina pebbles which have been heated several hundred degrees above reaction temperature, such as 2500° to 2700° F., are allowed to flow by gravity through throat 16 into reactor 10. While passing through throat 16, the hot alumina pebbles are mixed with nickel pebbles introduced through conduit 17. In this manner a mixture of non-catalytic heat-carrying pebbles and catalytic pebbles 20 passes through reactor 10, thus heating the mixture of hydrocarbons and steam to the desired temperature and catalyzing the reaction thereof to produce water gas.

A mixture of the alumina and the nickel pebbles 20 emerges from reactor 10, passes through conduit 18, and is fed by feeder 19 into gas lift 21 for elevation and separation into a stream of catalytic nickel pebbles in conduit 17 and a stream of non-catalytic alumina pebbles in conduit 24. Blower 25 is controlled to force a stream of gas through lift 21 at such a rate that the pebbles fed into the lift are carried along with the stream of gas, the heavier nickel pebbles being released from the stream where the lift expands in section 22 and the lighter alumina pebbles being released when the lifting gas stream expands into section 23. Each of tubes or sections 21 and 22 extends a short distance into the above tube or section of larger cross-section so as to form an annular pebble space of low gas velocity in the lower end of the upper sections 22 and 23. The released pebbles are returned to their respective inlets in throat 16 and in stack 26. The catalytic pebbles can be admitted directly to the upper portion of reactor 10 and, likewise, the non-catalytic pebbles may be introduced directly to the upper portion of pebble heater 13. Introduction of pebbles into stack 26, which carries flue gas from the pebble heater, aids in conserving heat by preheating the pebbles. As a modification of this feature an additional chamber may be positioned above the pebble heater to serve as a preheater, utilizing flue gas from stack 26 which may serve as a connecting throat between the two chambers.

Blower 25 conveniently draws water gas or other product gas from line 27 controlled by valves 28 and 29. In some cases it may be desirable to mix a non-deleterious gas with the product gas through line 30 and valve 31, especially when the volume of product gas being taken off through line 27 is insufficient to supply the quantity of gas required in lift 21. Where the volume of product from reactor 10 is more than sufficient to supply lifting gas, a portion of it may be sent via line 32 controlled by valve 33 to line 34 which carries product gas from lift 21 via line 36, cyclone separator 35, and valve 37 to product separation means 38. In another embodiment, product gas may be recirculated through the lift by taking gas from line 34 via line 32, valve 33, line 27 and valve 29. If desired product gas may be recirculated through the reactor via line 39 leading into line 11 and controlled by valve 41; and in some cases, it is desirable to recycle some of the separated product from separation means 38 via product line 42 and auxiliary line 43 controlled by valve 44 leading into feed line 11.

The apparatus may be operated at any desired pressures above, below, and at atmospheric but it is desirable to maintain substantially the same pressures in the pebble heater as in the reactor in any given operation. This manner of operation assists in preventing flow of gases from one chamber to another. Where it is necessary, steam may be introduced through lines 45, 46, 47, and 48 to serve as a block to movement of gases through conduits 24, 16, 17, and 18, respectively.

While the invention has been described by reference to the water gas reaction using alumina pebbles as heat-transfer material and nickel pebbles as catalytic pebbles, other processes using other combinations of pebbles are also contemplated within the invention. Hydrocarbon conversion processes utilizing a $\frac{3}{16}''$ alumina pebble as the heat-transfer material and $\frac{1}{4}''$ active alumina-chromium oxide pebbles stabilized with a small proportion of alkali or alkaline earth metal oxide as the catalytic pebbles, are very advantageously performed according to the invention. The pebbles may be separated according to their kind either by the gas lift as described or by screening. The larger catalytic pebbles readily drop out of the elevating gas stream upon lowering of the velocity thereof while still entraining the smaller non-catalytic pebbles until further reduction in velocity occurs. It is also feasible to separate the two types of pebbles according to their respective sizes by screening and then elevating each type to its respective inlet means. Elevation may be by any type of elevator means such as screw, bucket, or gas lift. The same type of elevator need not be utilized in elevating both types of pebbles. One modification of the invention involves elevating the mixed pebbles of different sizes by screw or bucket type elevator to a point above the level of the inlet to the pebble heater (conduit 24), dumping the mixed pebbles onto a separating screen, and returning the two types by gravity flow to their respective inlets.

In a further modification, the mixed pebbles are elevated by screw or bucket elevator to a point above the inlet for the catalytic pebbles (conduit 17) and there introduced to a gas lift in which the gas flow rate is sufficient to elevate the non-catalytic pebbles but insufficient to suspend the catalytic pebbles. The latter thus descend into the inlet conduit provided (17) and are returned to the reactor (10).

In the course of operation any fines developed within the system by erosion or abrasion are conveniently trapped in separator 35 and removed from the system. Fines may also be removed by screening in conduit 18. Provision can readily be made for introducing new or regenerated pebbles to the system and also for removing pebbles for regenerating or other purposes.

The invention described is particularly advantageous in that it provides for the use of catalytic material in the reactor of pebble heater type apparatus without interfering with the flow of heat transfer pebbles therethrough and avoiding the subjection of the catalyst to the severe conditions of temperature and oxidation which prevail in the pebble heating chamber. In this manner the life of the catalyst is greatly extended and the advantages of pebble heater operation are made available to many catalytic processes. Moreover, novel and useful features of pebble elevation and separation are provided which add to the utility and effectiveness of pebble heater operation.

The various modifications described provide for rather flexible operation to meet the varied conditions required in different processes. It will be understood that certain features and subcombinations may be desirable although not specifically described. This is contemplated by and is within the scope of the claims. It is also obvious that certain changes in details within the scope of the claims may be made without departing from the spirit of this invention. It is therefore to be understood that our invention is not to be unduly or unnecessarily limited to the specific details described and shown.

We claim:

1. A continuous process for conducting chemical reactions in vapor phase at elevated temperatures which comprises heating a gravitating mass of relatively non-catalytic pebbles in a heating zone to a temperature of at least 150° F. above a desired reaction temperature but below the softening temperature of said pebbles, gravitating the resulting stream of hot pebbles through a relatively narrow throat into the top of a reaction zone, maintaining a dense mass of pebbles in said throat so as to impede the flow of gas therein, simultaneously feeding into said stream of hot pebbles after said stream leaves said heating zone a stream of highly catalytic pebbles from a point exteriorly of both said zones thereby forming a stream of mixed pebbles, gravitating said stream of mixed pebbles through said reaction zone in contact with a stream of the desired reactant gases whereby said reactant gases are heated, catalyzed, and reacted to produce the desired product, separating said relatively non-catalytic pebbles from said highly catalytic pebbles, returning the former to said heating zone and the latter to said stream of hot pebbles at their original point of introduction to said stream, and recovering the product desired.

2. A continuous process for conducting chemical reactions in vapor phase at elevated temperatures which comprises heating a gravitating mass of relatively non-catalytic, non-metallic pebbles in a heating zone to a temperature of at least 150° F. above a desired reaction temperature but below the softening temperature of said pebbles, gravitating the resulting stream of hot pebbles through a relatively narrow throat to a reaction zone, simultaneously feeding into said stream of hot pebbles after said stream leaves said heating zone from a point exteriorly of both said zones a stream of highly catalytic pebbles of substantially greater density than said non-catalytic pebbles thereby forming a stream of mixed pebbles, gravitating said stream of mixed pebbles through said reaction zone in contact with a stream of the desired reactant gases whereby said reactant gases are heated, catalyzed, and reacted to produce the desired product, subjecting said mixed pebbles to the lifting action of a gas stream, reducing the velocity of said gas stream at a point higher than the point of inlet of said catalytic pebbles sufficently to disentrain said pebbles, separating and returning said last-named pebbles to said stream of hot pebbles at their original point of inlet, further reducing the velocity of said gas stream at a point higher than said heating zone sufficiently to disentrain said non-catalytic pebbles, returning said last-named pebbles to said heating zone to complete the cycle of operation, and recovering the product desired.

3. A continuous process for conducting chemical reactions in vapor phase at elevated temperatures which comprises heating a gravitating mass of relatively non-catalytic, non-metallic pebbles in a heating zone to a temperature of at least 150° F. above a desired reaction temperature but below the softening temperature of said pebbles, gravitating the resulting stream of hot pebbles through a relatively narrow throat to a reaction zone, simultaneously feeding into said stream of hot pebbles after said stream leaves said heating zone from a point exteriorly of both said zones a stream of metallic highly catalytic pebbles of substantially greater density than said non-metallic pebbles thereby forming a stream of mixed pebbles, gravitating said stream of mixed pebbles through said reaction zone in contact with a stream of the desired reactant gases whereby said reactant gases are heated, catalyzed, and reacted to produce the desired product, subjecting said mixed pebbles to sufficient lifting action of a gas stream to elevate said metallic pebbles to a point substantially above their point of inlet to said stream of hot pebbles but below the upper portion of said heating zone, reducing the velocity of said gas stream sufficiently to disentrain said metallic pebbles, separating and returning said metallic pebbles to their inlet point, again reducing the velocity of said gas stream at a point substantially above the upper portion of said heating zone sufficiently to disentrain said non-metallic pebbles, returning said non-metallic pebbles to said heating zone for reheating and recycling, and recovering the product desired.

4. The process of claim 2 in which the lifting gas comprises recycled product gas of the process.

5. The process of claim 3 in which the lifting gas comprises recycled product gas of the process.

6. An apparatus for effecting high temperature catalytic reactions in vapor phase by contacting vapor to be reacted with a gravitating mass of hot pebbles comprising in combination, an upper pebble heating chamber having inlet and outlet means for passing hot combustion gas therethrough, a pebble inlet conduit in the upper portion, and a pebble outlet in the bottom; a lower pebble reaction chamber having inlet and outlet means for passing a reactant vapor therethrough, a pebble inlet in the top, and a pebble outlet in the bottom; a pebble throat of smaller cross-section than said chambers disposed therebetween in open communication with the lower portion of said upper chamber through its pebble outlet and with the upper portion of said lower chamber through its pebble inlet so as to permit gravitation of pebbles between chambers; a pebble inlet conduit communicating with said pebble throat adapted so as to deliver a gravitating side stream of pebbles thereto; separator and elevator means adapted so as to separate pebbles into two types based upon characteristic physical difference, being connected by a pebble conduit with the pebble outlet in said lower chamber, said means having a first pebble delivery conduit in communication with the pebble inlet conduit in said throat and a second pebble delivery conduit in communication with the pebble inlet conduit in said upper chamber for separately delivering said two types of pebbles to said separate pebble inlets.

7. A continuous vapor-phase process for converting low-boiling hydrocarbons to water-gas which comprises heating a gravitating stream of alumina pebbles in a heating zone to a temperature in the range of 1650° to 3150° F. by contact with combustion gas; gravitating the heated stream of pebbles through a relatively narrow throat into the top of a subjacent reaction zone, simultaneously feeding into the gravitating stream of hot pebbles in said throat from a point exteriorly of both said zones a stream of pebbles comprising metallic nickel so as to form a mixed stream of alumina and nickel pebbles; gravitating said mixed stream through said reaction zone in contact with a mixed stream of low-boiling hydrocarbon and steam at correlated pebble and vapor flow rates so as to maintain a reaction temperature in the range of 1500° to 3000° F. and thereby effect conversion of reactants to water-gas; thereafter, separating and returning the alumina pebbles to said heating zone and the nickel pebbles to their original point of inlet; and recovering the vaporous product.

8. The process of claim 7 in which the separating and returning steps comprise subjecting said mixed stream of pebbles to sufficient lifting action of a gas stream to elevate the nickel pebbles to a point above their inlet to the alumina stream; reducing the velocity of the gas stream at said point only sufficiently to disentrain and gravitate the nickel pebbles to the stream of alumina pebbles while maintaining entrainment of the alumina pebbles; again reducing the velocity of gas stream at a point above the heating zone so as to disentrain and gravitate the alumina pebbles to said heating zone.

9. Apparatus for effecting high temperature catalytic reactions in vapor phase by contacting vapor to be reacted with a gravitating compact mass of hot pebbles, comprising in combination an upper pebble heating chamber having a gas inlet and a pebble outlet in the lower portion, and a pebble inlet and a gas outlet in the upper portion thereby adapting said chamber to gravitation of pebbles therethrough in countercurrent flow to heating gas; a lower pebble reaction chamber having a gas inlet and a pebble outlet in the lower portion, and a gas outlet and a pebble inlet in the upper portion thereby adapting said chamber to gravitation of pebbles therethrough in countercurrent flow to vapor to be reacted; a pebble throat of smaller cross-section than said chambers connecting the pebble outlet in the upper chamber with the pebble inlet in the lower chamber; a pebble inlet in the side of said pebble throat for introducing a side stream of pebbles thereto; a combination separator and elevator comprising a series of vertical concentric intercommunicating tubes of increasing cross-section from lowest to highest, each tube except the lowest overlapping the subjacent tube a short distance so as to form an annular pebble space of low gas velocity surrounding the inner tube at the point of overlapping, said tubes extending from a level below the pebble outlet in said lower chamber to a level above the pebble inlet in said upper chamber, the annular pebble space at the end of the smallest tube being at a level above the pebble inlet in said throat, and the annular pebble space around the end of the next larger tube being at a level above the pebble inlet in said upper chamber; a pebble conduit connecting said pebble space at the end of the smallest tube with the pebble inlet in said throat for gravitation of pebbles thereto; a pebble conduit connecting said pebble space at the end of said next larger tube with the pebble inlet in said upper chamber for gravitation of pebbles thereto; a pebble conduit connecting the pebble outlet in said lower chamber with the lower end of said smallest tube for gravitation of pebbles thereto; and a gas inlet at the lower end of said smallest tube for injecting a lifting gas into said separator and elevator.

10. A continuous process for effecting chemical reactions in vapor phase at elevated temperatures which comprises heating a gravitating compact mass of relatively non-catalytic pebbles in a heating zone to a temperature of at least 150° F. above a desired reaction temperature but below the softening temperature of said pebbles; gravitating the resulting stream of hot pebbles through a relatively narrow throat into the top of a reaction zone; simultaneously feeding into said stream of hot pebbles in said throat a stream of highly catalytic pebbles from a point exteriorly of both said zones thereby forming a compact stream of mixed pebbles; gravitating said stream of mixed pebbles through said reaction zone in contact with a stream of the desired reactant gas whereby said reactant gas is heated, catalyzed, and reacted to produce desired product; separating said relatively non-catalytic pebbles from said highly catalytic pebbles; returning the former pebbles to said heating zone and the latter to said stream of hot pebbles at their original point of introduction to said stream; and recovering the product desired.

PAUL M. WADDILL.
FRANK C. FOWLER.

REFERENCES CITED

The following references are of record in the file of this patent:

UNITED STATES PATENTS

| Number | Name | Date |
|---|---|---|
| 654,290 | Stebbins | July 24, 1900 |
| 2,389,636 | Ramseyer | Nov. 27, 1945 |
| 2,398,954 | Odell | Apr. 23, 1946 |
| 2,440,475 | Jacomini | Apr. 27, 1948 |
| 2,441,170 | Rose et al. | May 11, 1948 |